United States Patent [19]

Kretschmer

[11] Patent Number: 5,638,683
[45] Date of Patent: Jun. 17, 1997

[54] INJECTION DEVICE

[75] Inventor: Joachim Kretschmer, Feldafing, Germany

[73] Assignee: Daimler-Benz Aerospace AG, Munich, Germany

[21] Appl. No.: 356,880

[22] Filed: Dec. 15, 1994

[30] Foreign Application Priority Data

Dec. 16, 1993 [DE] Germany ............ 43 43 009.0

[51] Int. Cl.$^6$ ........................ F23R 3/28
[52] U.S. Cl. ........................ 60/742; 239/265.23
[58] Field of Search ............ 60/201, 270.1, 60/231, 738, 740, 743, 744; 239/265.23, 461, 124

[56] References Cited

U.S. PATENT DOCUMENTS

| | | | |
|---|---|---|---|
| 2,948,148 | 8/1960 | Anfreville et al. | 60/231 |
| 3,121,312 | 2/1964 | Hopper | 60/231 |
| 3,180,085 | 4/1965 | Gardiner et al. | 60/270.1 |
| 3,204,405 | 9/1965 | Warren et al. | 60/231 |
| 3,318,532 | 5/1967 | Gaubatz | 60/231 |
| 3,426,972 | 2/1969 | Osburn | 60/231 |
| 3,737,103 | 6/1973 | Howell | 239/265.23 |
| 4,694,992 | 9/1987 | Stouffer | 239/265.23 |

FOREIGN PATENT DOCUMENTS 0 305 996  4/1992  European Pat. Off. .

*Primary Examiner*—Michael Koczo
*Attorney, Agent, or Firm*—McGlew And Tuttle

[57] ABSTRACT

A fluidic nozzle which is flown through by a singular injection jet and which periodically deflects the injection jet. The nozzle has a nozzle channel, whose cross section is expanded in relation to the injection jet, and with control openings opening into the nozzle channel downstream close to the neck of the nozzle for injecting a control fluid that brings about the deflection of the jet. The nozzle channel has a channel cross section, which is two-dimensionally expanded in height and width in relation to the cross section of the jet, with a cross-section contour corresponding to the desired distribution cross section, and it is provided with a number of control openings. The control openings are arranged offset in relation to one another in the circumferential direction of the nozzle channel and are activated one after another in sequence to generate a jet movement rotating along the circumference of the nozzle channel.

15 Claims, 2 Drawing Sheets

INJECTION DEVICE

FIELD OF THE INVENTION

The present invention pertains to an injection device, especially for a jet engine, with at least one fluidic nozzle, through which passes a singular injection jet and which periodically deflects the injection jet with a nozzle channel, whose cross section expands in relation to the injection jet, and with control openings opening at right angles into the nozzle channel downstream close to the nozzle neck for injecting a control fluid bringing about the deflection of the jet.

BACKGROUND OF THE INVENTION

Injection devices have been known, in which the injected medium is widely fanned in the form of a ring cone coaxial with the injection nozzle, usually under the action of a swirling movement generated in the injection nozzle, and it is distributed over a large cross section in the surrounding medium, e.g., in the combustion chamber of a jet engine. However, the depth of injection that can be achieved with such swirl nozzles is relatively small, and the combustion chamber volume thoroughly mixed with the injected medium is correspondingly small as well.

A flow oscillator for generating a compact, singular liquid jet of long range has been known from EP-0 305 996-B1. This flow oscillator has a nozzle channel whose cross section is one-dimensionally expanded compared with the liquid jet, with a pair of diametrically opposed control openings arranged downstream close to the neck of the nozzle, with control fluid branched off via return channels being alternatingly admitted to the pair of control openings in order to thus switch the liquid jet between the narrow sides of the channel in a linearly oscillating manner. However, the injection path created by such a movement of the jet has a cross-sectional width that is limited to the jet cross section and is correspondingly narrow, so that a very great number of such flow oscillators arranged adjacent to one another are needed for the complete thorough mixing of surrounding spaces of great cross-sectional width.

SUMMARY AND OBJECTS OF THE INVENTION

A primary object of the present invention is to design an injection device of the class described in the introduction such that large-volume injection spaces of any desired cross-sectional configuration can be completely mixed with the medium injected with a simple design and with one fluidic nozzle or only a few fluidic nozzles.

According to the invention, an injection device, especially for a jet engine, is provided with at least one fluidic nozzle, through which passes a singular injection jet and which periodically deflects the injection jet with a nozzle channel. The nozzle channel cross section expands in relation to the injection jet. Control openings are provided opening at right angles into the nozzle channel downstream close to the nozzle neck for injecting a control fluid bringing about the deflection of the jet. The nozzle channel has a channel cross section expanding in height and width in relation to a nozzle neck. The nozzle channel has a freely selectable, non-circular cross section contour and is provided with a number of control openings. The control openings are arranged offset in relation to one another in the circumferential direction of the nozzle channel, and are activated one after another in sequence for generating a rotary movement of the jet along the circumference of the nozzle channel.

The control openings are preferably directed eccentrically to the nozzle channel axis (A) in the direction of rotation of the jet. The nozzle channel preferably has an oval, elliptical or rectangular or sector-shaped channel cross section.

The control fluid is taken from the injection jet via draw-off points, which are arranged downstream of the control openings and are connected to same via a return channel. The draw-off points are arranged offset in relation to the control opening associated with them in the direction of rotation of the jet. The return channels are designed as a delay section dimensioned corresponding to the desired frequency of rotation of the jet.

A plurality of fluidic nozzles are provided which are uniformly distributed over the cross section of the combustion chamber and generate a rotating fuel jet each. These fluidic nozzles are arranged in the annular ram air channel of the combustion chamber of a ram jet engine and are each provided with a nozzle channel. Each nozzle channel is of essentially ring sector-shaped cross section. The fluidic nozzle contains a central nozzle body, through which the nozzle channel passes, and an outer body, which surrounds the nozzle body and is provided with a draw-off edge at the nozzle channel outlet end. Return channels extend in a helical pattern from the draw-off edge to the said individual control openings between the nozzle body and the outer body.

As a consequence of the control fluid injection, which is cyclical in the circumferential direction of the nozzle channel and is independent from the ambient pressure, in conjunction with the special average contour of the nozzle channel, which is adapted to any desired distribution cross section, while maintaining a compact injection jet and consequently a great depth of penetration, a rotary movement of the injection jet is generated according to the present invention around the central axis of the nozzle channel along an extensively arbitrarily selectable rotation path and at a variably preselectable frequency of rotation according to an exclusively fluidic technique, and fine, large-volume addition of a gaseous or liquid injected medium to a surrounding medium is achieved as a result with a large distribution cross section, especially a combustion chamber of rectangular, oval or ring sector-shaped cross section of a ram jet engine. This provides the structural effect that only one or at most a few injection nozzles are needed for a uniform distribution of the injected medium, without disturbing overlapping or local distribution gaps developing at the distribution cross sections of the individual injection nozzles.

In another advantageous embodiment of the present invention, the control openings are preferably directed in the direction of rotation of the jet eccentrically to the axis of the principal channel to increase the control fluid impulses acting in the direction of the rotary movement of the injection jet. To ensure automatic injection of the control fluid with a simple design, the control fluid is preferably branched off from the injection jet proper at the outlet end of the nozzle channel and is returned to the control openings, with the control fluid draw-off points being arranged offset in the direction of jet rotation in relation to the corresponding associated control openings, in order to achieve a pressure impulse control that is especially effective for the rotary movement of the jet. The desired speed of rotation of the injection jet can be adjusted by a corresponding dimensioning of the length of the return channels acting as a retarding section between the draw-off points and the control openings. In an additional design simplification, the fluid nozzle itself may be prepared from a small number of individual parts with very small dimensions, namely, a central nozzle body, through which the nozzle channel passes, and an outer body, which surrounds the nozzle body and is provided with a draw-off edge at the outlet end of the nozzle channel, with return channels extending in a helical pattern from the draw-off edge to the control openings between the nozzle body and the outer body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1A:
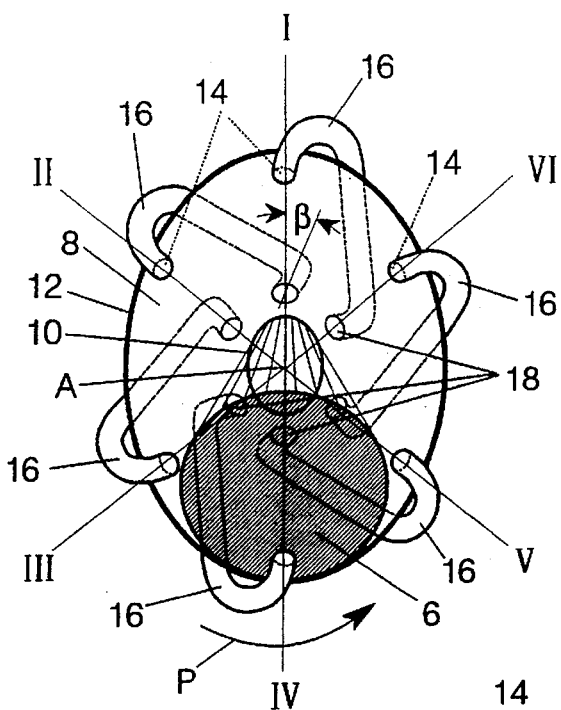
FIG. 1a, is a schematic sectional view of an injection device with elliptical nozzle channel cross section.
Figure 1B:
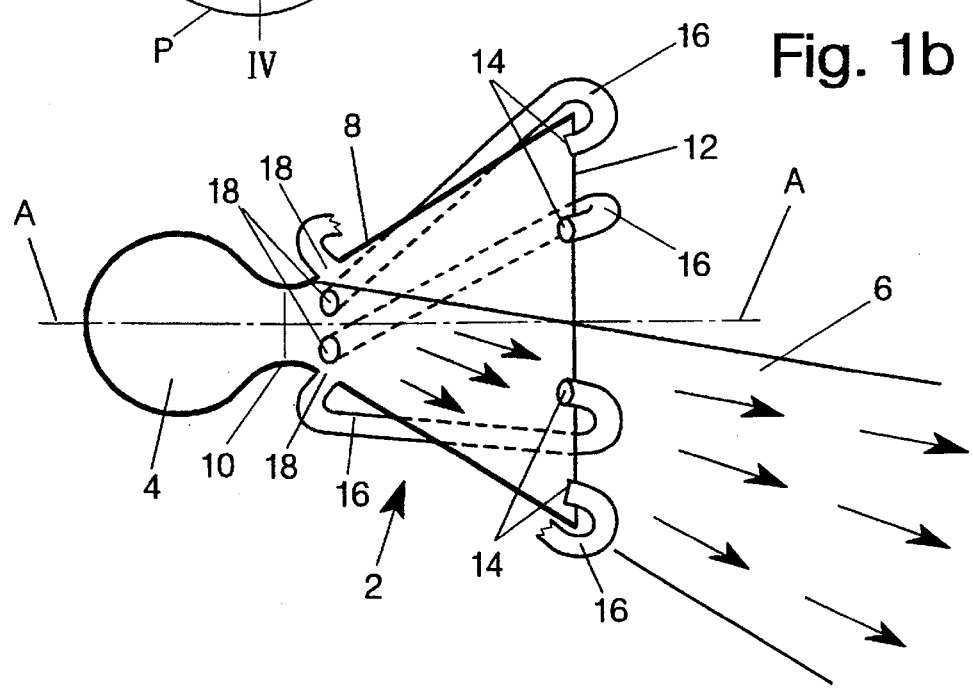
FIG. 1b, is a schematic side view of an injection device with elliptical nozzle channel cross section.

The injection device shown in FIGS. 1a and 1b contains a fluidic nozzle 2 with a feed chamber 4. The feed chamber 4 is supplied with a gaseous or liquid injected medium. A nozzle channel 8, which adjoins the feed channel 4, is flown through by the injection jet 6. The nozzle channel 8 has a non-rotationally symmetrical channel cross section, namely, an elliptical cross section according to FIG. 1a. The nozzle channel 8 is extended in an overexpanding manner in relation to the injection jet 6 in both the width and the height of the cross section beginning from the narrowest point in the area of the nozzle neck 10, in the direction of the outlet end 12 of the channel 8, so that the injection jet 6 comes into contact on one side with the nozzle channel wall under the action of the Coanda effect, as is indicated in FIG. 1a by the shaded cross-sectional position of the injection jet 6, which is eccentric in relation to the nozzle channel axis A.

By means of a control fluid injection, the injection jet 6 is set into a rotary movement along the nozzle channel wall on a rotation path corresponding to the elliptical channel cross section in order to achieve fine distribution of the injected medium over a large distribution cross section expanded in the direction of both principal axes of the cross section. A plurality of draw-off points 14 (six draw-off points 14 at the positions I through VI in the exemplary embodiment shown) are arranged for this purpose, uniformly distributed in the circumferential direction, at the nozzle channel outlet end 12. The draw-off points 14 reaching into the injection jet 6 branch off part of the injected medium from the injection jet 6 and return it via a return channel 16 to a control opening 18 opening into the nozzle channel 8 downstream close to the nozzle neck 10. The control openings 18 are also distributed uniformly in the circumferential direction of the channel and are arranged offset against the direction of rotation P of the jet in relation to the draw-off point 14 associated with it. To reinforce the rotation impulses imparted on the injection jet 6, the control openings 18 may also be directed eccentrically in relation to the nozzle channel axis A in the direction of rotation P of the jet, as is indicated in FIG. 1a by the oblique position of the control openings 18 in relation to the radial direction at the injection angle β.

Figure 2:
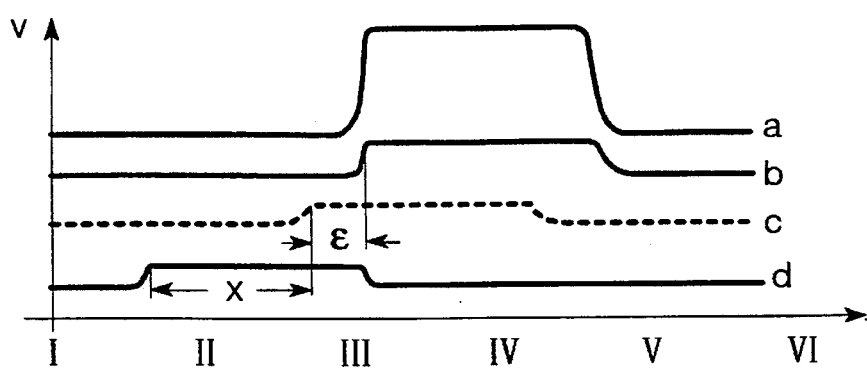
FIG. 2 is a diagram representing an instantaneous state of pressure at the individual draw-off and control openings of the injection device according to FIG. 1.

FIG. 2 shows the schematic course of the fluid flow v for the instantaneous jet position IV according to FIG. 1a. The injection jet 6, which comes into contact at IV, leaves the position III corresponding to the direction of rotation P, and moves in the direction of the position V, has the intensity distribution a. The draw-off point 14 correspondingly has full throughput at position IV, the throughput of the draw-off point 14 drops to zero at position III, and the draw-off point 14 has incipient throughput at position V (characteristic line b).

Depending on the length of the return channels 16, there is a varying time delay and correspondingly a varying phase shift g in the control fluid throughput between the draw-off-side end and the control opening-side end of the return channel 16, as is indicated by the broken characteristic line c of the return channel in FIG. 2, and since the control openings 18 are additionally recessed by one position in relation to the draw-off points 14 associated with them (offset x corresponding to the control opening characteristic line d), only the control openings 18 at the positions II and III have full throughput, whereas the control openings 18 at the positions IV and V have no throughput. Thus, the injection jet 6 detaches itself from position IV and rotates further along the nozzle channel wall in the direction of arrow P. The frequency of rotation of the injection jet 6 can be influenced, e.g., by the length of the return channels 16 and by the offset x of the control openings in relation to the draw-off openings.

Figure 3A:
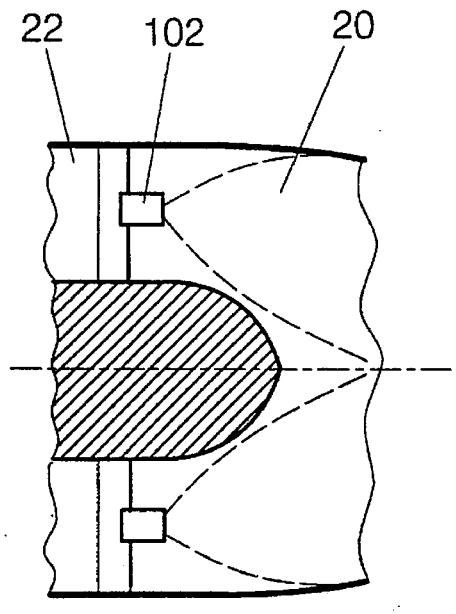
FIG. 3a is a longitudinal sectional view of a detail of the combustion chamber of a ram jet engine with an injection device arranged in the area of the ram air channel-side end of the combustion chamber.

FIG. 3a shows the combustion chamber 20 of a ram air engine with an injection device, which is arranged at the intake-side end of the combustion chamber in an annular ram air channel 22 and is comprised of a plurality of fluidic nozzles 102 distributed uniformly in the circumferential direction of the ram air channel 22. To achieve uniform fuel distribution over the entire cross section of the combustion chamber with the fuel jets of the individual fluidic nozzles 102, a ring sector-shaped injection space, which is delimited by broken lines in FIG. 3a, is associated with each fluidic nozzle 102, and each fluidic nozzle 102 has a correspondingly ring sector-shaped nozzle channel cross section, so that the fuel jets rotating along the nozzle channel wall due to the injection of control fluid periodically and completely migrate over the entire injection cross section.

Figure 3B:
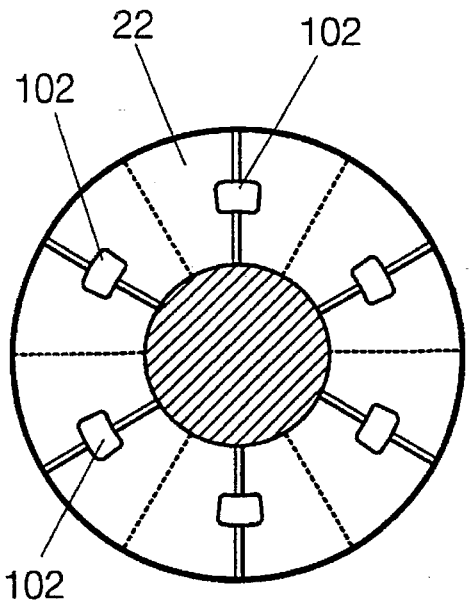
FIG. 3b is a cross sectional view of a detail of the combustion chamber of a ram jet engine with an injection device arranged in the area of the ram air channel-side end of the combustion chamber.
Figure 4A:
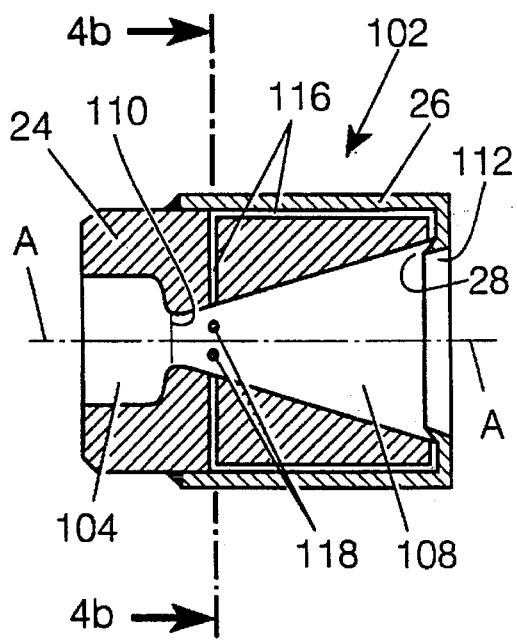
FIG. 4a is a longitudinal sectional view of one of the fluidic nozzles of the injection device according to FIGS. 3a and 3b.
Figure 4B:
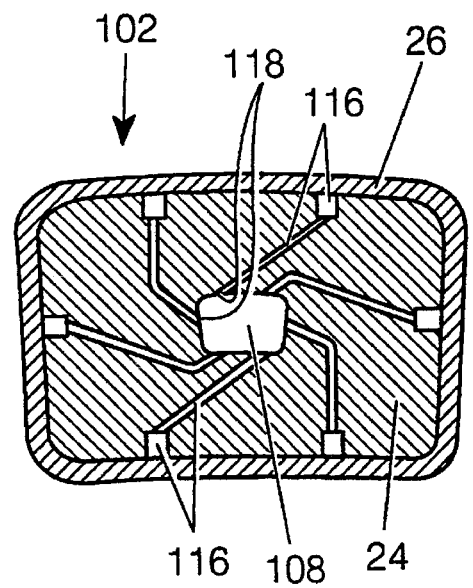
FIG. 4b is a cross sectional view taken along line 4b—4b of FIG. 4a of one of the fluidic nozzles of the injection device according to FIGS. 3a and 3b.

The longitudinal section of one of the fluidic nozzles 102 with ring sector-shaped distribution cross section is specifically shown in FIG. 4a, and its section along line 4b—4b is shown in FIG. 4b. It is comprised of a central nozzle body 24 with a feed chamber 104, which is joined by a ring sector-shaped nozzle channel 108. Channel 108 has a cross section which expands two-dimensionally in height and width in an overexpanding manner in relation to the fuel jet from the nozzle neck 110 to the nozzle outlet end 112, and into which control openings 118 directed eccentrically to the nozzle channel axis A open downstream, close to the nozzle neck 110, analogously to the first exemplary embodiment, for injecting a control fluid which brings about the rotary movement of the fuel jet. The nozzle body 24 is surrounded by an outer body 26 fastened to it, with a draw-off edge 28, which is arranged in the area of the nozzle outlet end 112 and from which control fluid return channels 116 milled into the nozzle body 24 extend to the individual control openings 118, so that the control fluid drawn off from the fuel jet is injected into the nozzle channel 108 at a control opening 118 that is recessed in relation to the direction of rotation of the jet. An essentially ring sector-shaped rotary movement of the fuel jet is thus generated. The design and the mode of operation of the fluidic nozzles 102 according to FIGS. 3 and 4 are otherwise the same as those in the first exemplary embodiment.

By properly selecting the nozzle channel cross sections, it is, of course, also possible to cover any other distribution cross section with a compact liquid injection jet, e.g., even a liquid injection jet.

While specific embodiments of the invention have been shown and described in detail to illustrate the application of the principles of the invention, it will be understood that the invention may be embodied otherwise without departing from such principles.

What is claimed:

1. An injection device, for a jet engine, comprising: a fluidic nozzle with a nozzle neck with a singular injection jet passing therethrough, said fluidic nozzle including a nozzle channel which periodically deflects the injection jet, said nozzle channel having a cross section which expands in relation to the injection jet, said nozzle channel cross section expanding in height and width in relation to said nozzle neck and having a non-circular cross section contour; control opening means opening at right angles into said nozzle channel, downstream of and adjacent to said nozzle neck, for injecting a control fluid for deflection of the jet, said control opening means including control openings arranged offset in relation to one another in the circumferential direction of the nozzle channel, said control openings being activated one after another in sequence for generating a rotary movement of the jet along the circumference of the nozzle channel and return channel means including draw-off points, which are arranged downstream of the said control openings for taking control fluid from said injection jet and supplying the control fluid to said control opening means.

2. An injection device in accordance with claim 1, wherein said nozzle channel has a nozzle channel axis and said control openings are directed eccentrically with respect to the nozzle channel axis (A) in a direction of rotation of the jet.

3. An injection device in accordance with claim 1 wherein said nozzle channel has an oval channel cross section.

4. An injection device in accordance with claim 1, wherein said draw-off points are arranged offset in relation to associated said control openings, in a direction of rotation of the jet.

5. An injection device in accordance with claim 1, wherein said return channels comprise a delay section dimensioned corresponding to a desired frequency of rotation of the jet.

6. An injection device, for a jet engine, comprising: a fluidic nozzle with a nozzle neck with a singular injection jet passing therethrough, said fluidic nozzle including a nozzle channel which periodically deflects the injection jet, said nozzle channel having a cross section which expands in relation to the injection jet, said nozzle channel cross section expanding in height and width in relation to said nozzle neck and having a non-circular cross section contour; control opening means opening at right angles into said nozzle channel, downstream of and adjacent to said nozzle neck, for injecting a control fluid for deflection of the jet, said control opening means including control openings arranged offset in relation to one another in the circumferential direction of the nozzle channel, said control openings being activated one after another in sequence for generating a rotary movement of the jet along the circumference of the nozzle channel and a combustion chamber and additional fluidic nozzles cooperating with said fluidic nozzle to provide a plurality of fluidic nozzles uniformly distributed over a cross section of said combustion chamber, each of said plurality of fluidic nozzles including said control opening means to each generate a rotating fuel jet.

7. An injection device in accordance with claim 6, wherein said plurality of fluidic nozzles are arranged in an annular ram air channel of said combustion chamber of a ram jet engine and are each provided with a nozzle channel of essentially ring sector-shaped cross section each.

8. An injection device in accordance with claim 6, wherein said plurality of fluidic nozzles each contain a central nozzle body, through which said nozzle channel passes, and an outer body, which surrounds said nozzle body and is provided with a draw-off edge at the nozzle channel outlet end, with return channels extending in a helical pattern from the draw-off edge to said individual control openings between the nozzle body and the outer body.

9. An injection device in accordance with claim 1 wherein said nozzle channel has an elliptical channel cross section.

10. An injection device in accordance with claim 1 wherein said nozzle channel has a rectangular channel cross section.

11. An injection device in accordance with claim 1 wherein said nozzle channel has a sector-shaped channel cross section.

12. An injection device for a jet, the device comprising:
   a fluidic nozzle, through which a singular injected jet flows, with a nozzle throat having a nozzle throat cross section and a nozzle channel with a nozzle channel cross section which is expanded in relation to said nozzle throat cross section, said nozzle channel cross section being not circular and having a greater cross-sectional width and height than the injected jet;
   deflecting means for deflecting the injected jet in the nozzle channel, including a series of control openings, which are arranged offset in relation to one another in a circumferential direction of the nozzle channel and open transversely into the nozzle channel downstream of and adjacent to the throat of the nozzle, for injecting a control fluid which brings about the deflection of the jet, and
   means for generating a circulating movement of the injected jet along the circumference of the cross section of the nozzle channel, including means for activating said control openings one after another in a time sequence in the circumferential direction of the injected jet.

13. An injection device in accordance with claim 12 wherein said deflecting means includes return channel means including draw-off points, which are arranged downstream of the said control openings for taking control fluid from said injection jet and supplying the control fluid to said control openings.

14. An injection device in accordance with claim 13 wherein said means for generating circulating movement is provided by positioning said draw-off points offset in relation to associated said control openings, in a direction of rotation of the jet whereby said control openings are activated one after another in sequence for generating a rotary movement of the jet along the circumference of the nozzle channel.

15. An injection device in accordance with claim 12, further comprising a combustion chamber and additional fluidic nozzles cooperating with said fluidic nozzle to provide a plurality of fluidic nozzles uniformly distributed over a cross section of said combustion chamber, each of said plurality of fluidic nozzles including said control openings to each generate a rotating jet.

\* \* \* \* \*